United States Patent
Chapp

[11] 3,723,087
[45] Mar. 27, 1973

[54] HERBICIDAL COMPOSITIONS AND METHODS

[75] Inventor: John P. Chapp, Kirkwood, Mo.

[73] Assignee: Monsanto Company, Saint Louis, Mo.

[22] Filed: Sept. 9, 1970

[21] Appl. No.: 70,892

Related U.S. Application Data

[62] Division of Ser. No. 623,541, March 16, 1967, Pat. No. 3,609,143.

[52] U.S. Cl............................................71/92, 71/88
[51] Int. Cl. ...............................................A01n 9/22
[58] Field of Search...........................................71/92

[56] References Cited

UNITED STATES PATENTS

| | | | |
|---|---|---|---|
| 3,525,747 | 8/1970 | Jacobs | 71/92 X |
| 3,126,404 | 3/1964 | Flynn et al | 260/453 |
| 3,444,231 | 5/1969 | Menz | 260/453 |

OTHER PUBLICATIONS

Lange; J. Am. Chem. Soc., Vol. 48, pp. 2,440–2,444 (1926).

Clemens; J. Org. Chem., Vol. 26, pp. 767–769 (1961).

*Primary Examiner*—James O. Thomas, Jr.
*Attorney*—Neal E. Willis, John J. Henschke, Jr. and David D. Centola

[57] ABSTRACT

Phytotoxic and soil sterilant compositions containing compounds of the formula $(CH_2 = N-R)_3(R^1NCO)_2$ and having either of the following structures:

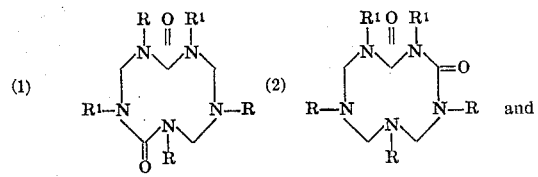

(3) mixtures of (1) and (2)

wherein R is alkyl having a maximum of four carbon atoms and $R^1$ is selected from the group consisting of mono- and dihalo-substituted phenyl and monoitrosubstituted phenyl are disclosed as well as phytotoxic methods employing such compositions.

8 Claims, No Drawings

HERBICIDAL COMPOSITIONS AND METHODS

This application is a division of applicant's application Ser. No. 623,541, filed Mar. 16, 1967, now U.S. Pat. No. 3,609,143.

Organic isocyanates are known to undergo addition and polymerization reactions to yield a wide variety of products. The alcoholysis and aminonolysis of isocyanates to yield urethans and substituted ureas is well known. The products are frequently solids and are used to identify the corresponding alcohol or amine.

It has now been found that aryl isocyanates react with azomethines (or their trimers) to yield solid adducts which have phytotoxic activity.

It is an object of this invention to provide a novel process for the preparation of isocyanate-azomethine adducts.

It is a further object of this invention to provide a process for the preparation of novel aryl isocyanate-azomethine adducts.

It is a further object of this invention to utilize isocyanate-azomethine adducts as herbicides.

Further objects, aspects and advantages of the invention will be apparent from the description which follows.

Briefly, this invention provides a process for the preparation of novel isocyanate-azomethine adducts by reacting an azomethine (or its trimer) with an aryl isocyanate in an approximate temperature range of 0°–50° C. The reaction proceeds according to the following equation:

$$3 (CH_2{=}_{N-R}) + 2 R^1NCO \rightarrow (CH_2{=}R)_3(R^1NCO)_2 \quad I$$

wherein R is an alkyl group having a maximum of four carbon atoms and $R^1$ is selected from the group consisting of halosubstituted phenyl and nitrosubstituted phenyl.

The term "adduct" as used herein is the chemical addition product formed from the reactants. It is a new compound having a separate entity than the reactants. Therefore, the terms "adduct" and "compounds" will be used interchangeably.

As seen in the equation above the molar ratio of azomethine to isocyanate is preferably about 3:2. This ratio yields an adduct (I) which is essentially uncontaminated with either of the starting compounds. This optimum mole ratio was determined by infra-red and nuclear magnetic resonance studies of the reaction medium in which various ratios of isocyanate and azomethine were reacted. The presence of the NCO band at 4.5 micron ($\mu$) in the infra-red was indicative of the presence of unreacted isocyanate in the medium. The presence of unreactive azomethine appeared in the nuclear magnetic resonance spectra of the reaction medium.

When two moles of azomethine per mole of isocyanate are reacted, the reaction medium was found, by the above analysis, to contain unreacted azomethine and the absence of any measurable amount of unreacted isocyanate.

Changing the molar ratio of 1:1 shows by analysis that the isocyanate is in excess and that no measurable amount of azomethine is present.

The reaction of 3 moles of azomethine per 2 moles of isocyanate yielded the desired product without either unreacted isocyanate or unreacted azomethine being detected in the reaction medium. This, therefore, shows that the adducts consist of 3 moles of azomethine per 2 moles of isocyanate. This was confirmed by infra-red, nuclear magnetic resonance, molecular weight and elemental analysis of the adduct.

It is apparent from the above description that some adduct is formed regardless of the proportions of reactants used in the process. In order to minimize the requirements of separation of the desired adduct from the reaction mixture, it is preferred to use an approximate molar ratio of 3:2 (azomethine:isocyanate).

In the preparation of the adducts, the reactants are normally dissolved in an organic solvent, such as pentane, and combined, preferably at temperatures in the approximate range of 0°–50° C. The reaction mixture is then maintained for an extended period of time, about 2 to 4 days, at approximately room temperature. The product, which separates from the solvent as a solid, is separated and triturated with a suitable solvent, e.g. diethyl ether, and the solvent removed, preferably under reduced pressure at approximately room temperature.

Other solvents, such as aliphatic and aromatic hydrocarbons, ethers and the like, can be used as the reaction medium. These solvents include, but are not limited to, pentane, hexane, heptane, benzene, cyclohexane, toluene, methyl ethyl ether, diethyl ether, and isopropyl ether. Preferred solvents are those in which the adduct is insoluble, both the azomethine and isocyanate are soluble, and which can be easily removed under reduced pressure at about room temperatures. Aromatic hydrocarbons can be used, but since they usually have a high solubility for the product and are difficult to remove from the product, aliphatic hydrocarbons are generally preferred as the reaction medium.

The reaction temperature is preferably maintained between about 0° and about 50° C., but temperatures above and below this range can be employed. Above about 50° C., the formation of the desired product is hindered and the yield, which normally is essentially quantitative, appreciably decreases.

The isocyanate-azomethine adduct has been assigned a generic configuration II

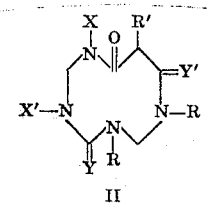

II wherein X and X' is either R or R' and Y and Y' is either $H_2$ or oxygen; R and R' are as previously defined; provided that when X' is R', then X is R, Y' is $H_2$ and Y is oxygen (compound III); and further provided that when X' is R, then X is R; Y' is oxygen and Y is $H_2$ (compound IV).

This configuration is based on infra-red, nuclear magnetic resonance, molecular weight, physical properties, elemental analysis and experimental reaction data.

The adduct formed by the process of this invention is either compound III, compound IV or a mixture of the two compounds:

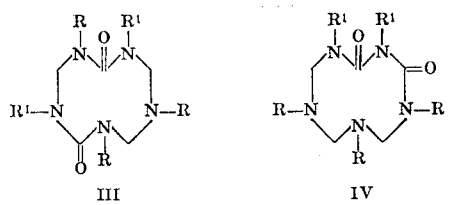

These compounds, III and IV differ in the position of the isocyanate groups, which are adjacent groups in formula IV and separated by an azomethine group in formula III. Both formulas III and IV satisfy the molecular weight and spectral data. Nuclear magnetic resonance data show that all N-methyl groups and methylene groups are non-equivalent, which would be expected from both formulas.

Preparation of the reactants azomethines and isocyanates are according to well-known synthetic procedures. Azomethine trimer (hexahydrotriazine) was prepared by reacting an aldehyde and an amine according to the procedure of H. Ulrich and J. Rubenfeld, Journal of Organic Chemistry 26, 1937 (1961).

The following examples are illustrative only of the invention, the preparation of the compounds and their use as herbicides and soil sterilants, and should not be construed as limiting the invention. For convenience and clarity, the nomenclature used in the examples and throughout the specification is based on the structure of formula III.

EXAMPLE I

Preparation of 1,5-Bis-(3,4-dichlorophenyl)-hexahydro-3,7,9-triethyl-1,3,4,7,9-pentazecine-2,6-(1 H,5H)-dione is according to the following procedure:

Trimeric N-ethyl azomethine (1,3,5-triethylhexahydro-triazine) (0.0367 mole, 6.27 g) was dissolved in about 50 ml dry pentane and then added, with stirring, to a clear filtered solution of 0.0734 mole (13.8 g) of 3,4-dichlorophenylisocyanate dissolved in about 100 ml of dry pentane. An exothermic reaction occurred upon addition of the azomethine. Following the addition the reaction flask was sealed and allowed to stand at room temperature (about 25° C.) for 2 days. The pentane solution was then decanted and the residue pulverized to a fine white powder, yield 16.2 g. This powder was then triturated with about 50 ml dry diethyl ether, the ether removed and the residue vacuum stripped of solvent at room temperatures to yield 13.3 g of a dry white solid, m.p. 109°–112.5° C. (decomposition), $C_{23}H_{27}Cl_4N_5O_2$:

| | Analysis | |
|---|---|---|
| | Calculated | Found |
| N | 12.80 | 12.57 |
| Cl | 25.91 | 25.94 |
| M.W. | 547 | 538 |

Molecular weight determination was an osometric determination in chloroform. Infra-red spectra had a strong carbonyl bond at 6.0 – 6.1 u. Nuclear magnetic resonance spectra were in $CDCl_3$ and provided the following results:

| $NCH_2N$ | $NCH_2CH_3$ | $NCH_2CH_3$ |
|---|---|---|
| (Singlet,2H ea.) | (Quartet,2H ea.) | (Triplet,3H ea.) |
| 4.02 | 2.70 | 1.08 |
| 4.41 | 3.50 | 1.19 |
| 4.67 | 3.62 | 1.24 |

EXAMPLE 2

The procedure of Example 1 was repeated, with the exception that dry diethyl ether was used as the solvent in place of dry pentane, to yield 1,5-Bis(3,4-dichlorophenyl) hexahydro-3,7,9-triethyl-1,3,5,7,9-pentazecine-2,6-(1H,5H)-dione.

EXAMPLE 3

The procedure of Example 1 was repeated using trimeric N-methyl azomethine (1,3,5-trimethyl hexahydrotriazine) in place of the trimeric N-ethyl azomethine, to yield 1,5-Bis(3,4-dichlorophenyl)hexahydro-3,7,9-trimethyl-1,3,5,7,9-pentazine-2,6-(1 H,5H)-dione, $C_{20}H_2$, $Cl_4N_5O_2$, m.p. 101°–112° C. (decomposition). Analysis: Calculated: N = 13.87; Cl = 28.08 M.W. = 505; Found: N = 13.33; Cl = 27.58; M.W. = 512. Molecular Weight determination was an Osometric determination in benzene.

EXAMPLE 4

The procedure of Example 1 was repeated using 4-nitrophenylisocyanate in place of 3,4-dichlorophenylisocyanate to yield 1,5-Bis(4-nitrophenyl)-hexahydro-3,7,9-triethyl-1,3,5,7,9-pentazecine-2,6-(1 H,5H)-dione.

EXAMPLE 5

The procedure of Example 1 was repeated using 3-chloro-phenylisocyanate in place of 3,4-dichlorophenylisocyanate to yield 1,5-Bis(3-chlorophenyl)hexahydro-3,7,9-triethyl-1,3,5,7,9-pentazecine-2,6-(1 H,5H)-dione, $C_{20}H_{23}Cl_2N_5O_2$, m.p. 97°–104° C. (decomposition). Analysis: Calculated: N = 16.06, Cl = 16.26; M.W. = 436; Found: N = 15.84, Cl = 16.20; M.W. = 436. Molecular weight determination was an osometric determination in chloroform.

The compounds of this invention have been found to exhibit soil sterilant and herbicidal activity. Herbicidal activity has been shown in both the pre-emergent and post-emergent state, that is, the application of an effective amount of the compounds of this invention to seeds, emerging seedlings, the roots or above ground portion of established vegetation, controls or modifies the growth of, germinated seeds, emerging seedlings and established vegetation.

The active ingredient can be applied alone or in combination with a material referred to in the art as a herbicidal adjuvant in liquid or solid form. The herbicidal compositions of this invention are prepared by admixing the active ingredients with an adjuvant which includes diluents, solid or liquid extenders, carriers and conditioning agents to provide compositions in the form of finely divided particulate solids, granules, pellets, solutions and aqueous dispersions or emulsions. Thus the active ingredient can be used with an adjuvant such as a finely-divided particulate solid, a solvent liquid of organic origin, water, a wetting agent, dispersing agent, an emulsifying agent or any suitable combination of these.

"Herbicidal composition" as used herein and in the appended claims includes not only compositions in a suitable form for application but also concentrated compositions which require dilution or extension with a suitable quantity of liquid or solid adjuvant prior to application.

The following examples illustrate the herbicidal activity of the adduct:

EXAMPLE 6

Post-Emergent Herbicidal Activity

An aluminum pan approximately 9 × 13 × 2 inches is filled with top soil and the soil compacted to within three-eights inch from the top of the pan. A predetermined number of seeds of the following plant species: cotton, corn, soybeans, cocklebur, crab grass, lambsquarter, wild oats, smartweed, brome, barnyard grass, sugar beet, wheat, rice and coffeeweed, are placed on the top of the soil and the pans filled with top soil and leveled. The pans are watered through apertures in the bottom of the pans and are then maintained under ordinary greenhouse conditions of sunlight and water for 14 days.

The ingredient to be tested is applied to the 14 day old plants in spray form. The herbicidal sprays are acetone-water solutions containing 0.1 and 0.02 percent by weight of active ingredient and 0.4 ml of a 3:1 cyclohexanol emulsifier (butyl-amine salt of dodecyl-benzenesulfonic acid 35 percent; tall oil - ethylene oxide condensate 65 percent) solution and are applied at a rate of 2 and 0.4 pounds of active ingredient per acre of land, respectively. The treated plants are placed in a greenhouse and the effects are observed and recorded after 28 days.

The results are tabulated, as percent control, in Table I. Identification of the plants used is as follows:

| A | Cotton | H | Smartweed |
|---|---|---|---|
| B | Corn | I | Brome Grass |
| C | Soybean | K | Barnyard Grass |
| D | Cocklebur | L | Sugar Beet |
| E | Crab Grass | M | Wheat |
| F | Lambsquarter | O | Rice |
| G | Wild Oat | P | Coffee Weed | ingredient per acre has been applied to the soil surface. The pans are watered through apertures in the bottom of the pans, and are then maintained under ordinary greenhouse conditions of sunlight and water for 14 days.

The plants are observed at the end of 14 days and the results recorded. The herbicidal activity index is based on the average percent germination of each seed lot.

The pre-emergent herbicidal activity index used in Table II is defined as follows:

| Average Percent Germination | Numerical Scale | Herbicidal Activity |
|---|---|---|
| 76 to 100 | 0 | No Activity |
| 51 to 75 | 1 | Slight Activity |
| 26 to 50 | 2 | Moderate Activity |
| 0 to 25 | 3 | Severe Activity |

Identification of the seeds used is as follows:

| A | Morning Glory | H | Crab Grass |
|---|---|---|---|
| B | Wild Oat | I | Pigweed |
| C | Brome | J | Soybean |
| D | Rye Grass | K | Wild Buckwheat |
| E | Radish | L | Tomato |
| F | Sugar Beet | M | Sorghum |
| G | Foxtail | | |

The compound identification is the same as in Table I.

TABLE II.—PRE-EMERGENT HERBICIDAL ACTIVITY

| Compound | Rate, lbs./acre | A | B | C | D | E | F | G | H | I | J | K | L | M |
|---|---|---|---|---|---|---|---|---|---|---|---|---|---|---|
| (1) | 10 | 2 | 3 | 2 | 3 | 2 | 3 | 3 | 3 | 3 | 0 | 3 | 3 | 3 |
| (2) | 10 | 3 | 3 | 3 | 3 | 3 | 3 | 3 | 3 | 3 | 2 | 3 | 3 | 3 |
| (3) | 10 | 0 | 0 | 0 | 0 | 0 | 1 | 0 | 2 | 3 | 0 | 0 | 0 | 0 |
| (4) | 10 | 1 | 1 | 1 | 1 | 2 | 3 | 2 | 3 | 3 | 0 | 2 | 2 | 1 |

TABLE I.—POST-EMERGENT HERBICIDAL ACTIVITY

| Compound | Rate, lbs./acre | A | B | C | D | E | F | G | H | I | J | K | L | M | N | O | P |
|---|---|---|---|---|---|---|---|---|---|---|---|---|---|---|---|---|---|
| (1) | 2 | 0 | 60 | 100 | 100 | 35 | 100 | 10 | 30 | 15 | 100 | 15 | 100 | 30 | 45 | 40 | 90 |
|     | 0.4 | 0 | 0 | 0 | 0 | 10 | 100 | 0 | 0 | 0 | 100 | 0 | 60 | 0 | 5 | 0 | 15 |
| (2) | 2 | 10 | 25 | 0 | 10 | 0 | 55 | 0 | 15 | 0 | 25 | 0 | 0 | 5 | 20 | 10 | 25 |
|     | 0.4 | 0 | 0 | 0 | 0 | 0 | 0 | 0 | 0 | 0 | 0 | 0 | 0 | 0 | 0 | 0 | 0 |
| (3) | 2 | 0 | 0 | 0 | 0 | 25 | 90 | 0 | 15 | 0 | 60 | 0 | 30 | 0 | 5 | 0 | 0 |
|     | 0.4 | 0 | 0 | 0 | 0 | 0 | 0 | 0 | 0 | 0 | 0 | 0 | 15 | 0 | 0 | 0 | 0 |
| (4) | 2 | 10 | 25 | 10 | 40 | 25 | 100 | 50 | 60 | 10 | 95 | 35 | 75 | 15 | 15 | 15 | 58 |
|     | 0.4 | 0 | 0 | 0 | 0 | 0 | 60 | 0 | 0 | 0 | 100 | 0 | 30 | 0 | 0 | 0 | 10 |

(1) 1,5-bis (3,4-dichlorophenyl-)hexahydro-3,7,9-trimethyl-1,3,5,7,9-pentazecine-2,6-(1H,5H) dione.
(2) 1,5-bis (3-chlorophenyl-)hexahydro-3,7,9-trimethyl-1,3,5,7,9-pentazecine-2,6-(1H,5H) dione.
(3) 1,5-bis (3,4-dichlorophenyl-)hexahydro-3,7,9-triethyl-1,3,5,7,9-pentazecine-2,6-(1H,5H) dione.
(4) 1,5-bis (4-chorophenyl-)hexahydro-3,7,9-trimethyl-1,3,5,7,9-pentazecine-2,6-(1H,5H) dione.

EXAMPLE 7

Pre-emergent Herbicidal Activity

An aluminum pan approximately 9 × 6 × 3 inches, is filled with a good grade of top soil and the soil compacted to within three-eighths inch from the top of the pan. A predetermined number of seeds of the following plant species: morning glory, wild oat, brome, rye grass, radish, sugar beet, foxtail, crab grass, pigweed, soybean, wild buckwheat, tomato and sorghum are placed on the top of the soil and the pans filled with top soil and leveled. The herbicidal composition is applied by spraying the surface of the top layer of soil, prior to watering the seeds, until a rate of 10 pounds of active At concentrations less than 5 pounds per acre, and preferably in the approximate range of 2 to 4 pounds per acre, the compounds of this invention exhibit a selective pre-emergent herbicidal effect in addition to the residual effect which is advantageous for specific weed control in crops such as corn, cotton and soybean (Table III).

EXAMPLE 8

An aluminum pan, approximately 9 × 6 × 3 inches is filled with a good grade of top soil and the soil compacted to within three-eighths inch from the top of the pan. A predetermined number of seeds of the species listed in Table III are placed on the top of the soil and the pans filled with top soil and leveled. The herbicidal composition is mixed with the cover layer of soil in rates equivalent to 4, 2 and 1 pound per acre. The pans are watered through apertures in the bottom of the pan and then maintained under ordinary greenhouse conditions of sunlight and water.

The plants are observed at the end of 14 days or 28 days depending upon the rate of herbicidal application and the results recorded. The herbicidal activity index is based on the average percent germination of each seed lot, as described in Example 7.

Identification of the seeds used is as follows:

| A | Cotton | I | Brome |
|---|---|---|---|
| B | Corn | J | Pigweed |
| C | Soybean | K | Barnyard Grass |
| D | Cocklebur | L | Sugar Beet |
| E | Crab Grass | M | Wheat |
| F | Lambsquarter | N | Velvet Leaf |
| G | Wild Oat | O | Rice |
| H | Smartweed | P | Coffee Weed | of the pan and then maintained under normal greenhouse conditions, using subirrigation, for a period of 6 weeks. At the end of this period, the plants are observed for the effect of the active ingredients.

The pans will then be oven dried, the top one-half inch of the topsoil removed and the plants reseeded. The removed topsoil is mixed with the equivalent of 50 pounds per acre of nitrogen and the topsoil replaced. The pans are then watered, as before and maintained under normal greenhouse conditions, with subirrigation, for 6 weeks. At the end of this period, the plants are once again observed for the effects of the active ingredient.

The second cycle is repeated as long as three or more grasses or broadleafs or the nutsedge are controlled 75 percent or more by the original application.

The soil sterilant activity is reported in Table III as percent control. The compound used in Table IV is the adduct of 3,4-dichlorophenylisocyanate and N-methylazomethine.

TABLE III.—PRE-EMERGENT HERBICIDAL ACTIVITY

| Compound | Rate, lbs./acre | A | B | C | D | E | F | G | H | I | J | K | L | M | N | O | P | Plants observed after— | Remarks |
|---|---|---|---|---|---|---|---|---|---|---|---|---|---|---|---|---|---|---|---|
| (1) | 4 | 0 | 0 | 0.5 | 1.5 | 3 | 3 | 2 | 2.5 | 2 | 3 | 3 | 3 | 1.5 | 2.5 | 0.5 | 3 | 14 days | Average of 2 runs. |
|  | 2 | 0 | 0 | 0 | 0 | 2 | 3 | 0 | 0 | 0 | 3 | 2 | 2 | 0 | 0 | 1 | 2 | 28 days | Do. |
|  | 1 |  | 0 | 0 |  | 2 | 3 | 0 | 0 | 0 | 3 | 0 | 3 | 1 | 0 | 0 | 0 | do |  |

(1) Adduct of 3,4-dichlorophenylisocyanate and N-methylazomethine.

Many herbicides are deficient in that they are rapidly dissipated or destroyed in the soil and, therefore, have little or no residual effect.

When such compounds are used for weed control in crops, multiple applications are required during the crop growing and harvesting periods to insure adequate weed control.

For applications requiring a soil sterilant effect, such as railroad right away where plant control over an extended period of time of several years is desired, these prior art herbicides are applied in large quantities of 50 to 60 pounds per acre.

It has been found that the compounds of this invention possess a residual effect when applied in relatively small amounts of 5 to 10 pounds per acre. This persistency permits the use of the compounds as soil sterilants for general weed control.

At concentrations less than 5 pounds per acre, and preferably in the approximate range of 2 to 4 pounds per acre, the compounds of this invention exhibit a selective pre-emergent herbicidal effect which may be advantageously used for specific weed control in crops such as corn, cotton and soybean.

An example of the soil sterilant activity of the compounds of this invention for general weed control is illustrated by the following:

EXAMPLE 9

Metal pans, 9 ½ × 5 ½ × 2 ¾ inches, are filled, and compacted, to the top with air dry Memphis silt loam. The active ingredient is sprayed on the soil surface until a rate of 5 pounds per acre has been applied to the soil surface. The pans are then held dry for 3 weeks under greenhouse conditions. After the 3 week period, the top one-half inch of soil is removed and the appropriate plant species to be tested seeded. The top soil, which was removed, is mixed by hand and replaced over the seeds. The pans are then watered through the bottom

TABLE IV

SOIL STERILANT ACTIVITY

| Plant | Cycles | | | |
|---|---|---|---|---|
|  | 1 | 2 | 3 | 4 |
| Pigweed | 100 | 100 | 100 | 100 |
| Morning Glory (Ann.) | 95 | 95 | 90 | 20 |
| Smartweed | 100 | 100 | 85 | 30 |
| Cockelbur | 100 | 75 | — | — |
| Italian Rye Grass | 100 | 100 | 100 | 90 |
| Rye | 60 | 100 | 100 | 60 |
| Sorghum | 99 | 100 | 75 | 60 |
| Quackgrass | 100 | 100 | 90 | 100 |
| Nutsedge (No.) | 0 | 0 | 0 | 40 |

Results are in per cent control.

Active ingredient — adduct of 3,4-dichlorophenylisocyanate and N-methylazomethine applied to a rate of 5 pounds per acre.

From the foregoing data, it is apparent that the compounds of this invention are effective as soil sterilants and as pre- and post-emergent herbicides.

Selective pre- and post-emergent herbicidal activity was obtained by applications of amounts as low as 1 lb. of a compound of this invention per acre.

Soil sterilant activity has been shown when applied at a rate equivalent to 5 pounds per acre. In normal application a rate equivalent to 5–50 pounds per acre is used.

In order that the active ingredients of this invention can be used to their greatest advantage in modifying the growth of plant systems in soil, preferred herbicidal compositions have been developed which comprises certain wettable powders, aqueous suspensions, dust formulations, granules, emulsifiable oils and solutions in solvents. These compositions can also contain, as a conditioning agent, one or more surface active agent in an amount sufficient to render a given composition containing the active component readily dispersible in water or in oil. The term "surface-active agent" includes wetting agents, dispersing agents, suspending agents, emulsifying agents and the like.

Surface-active agents which can be used in the herbicidal compositions are set out, for example, in Searle U.S. Pat. No. 2,426,417; Todd U.S. Pat. No. 2,655,447; Jones U.S. Pat. No. 2,412,510; or Lenher U.S. Pat. No. 2,139,376. A detailed list of such agents is set forth in "Detergents and Emulsifiers — Up-to-date" (1961) by J. W. McCutcheon, Inc.; Bulletin E–607 of the Bureau of Entomology and Plant Quarantine of the U.S. Department of Agriculture; and "Soap and Chemical Specialties" (November 1947) pages 8,011 et seq. The surface-active agents are generally employed at concentrations of about 1 to 15 parts by weight per 100 parts by weight of the herbicidal composition.

Powdered or dust herbicidal compositions are usually characterized by their free-flowing and rapid settling properties. They are dense, finely-divided particulate compositions intended for application to the soil in a dry form. Dusts are primarily comprised of the active ingredient and a dense, free-flowing, finely divided particulate extender. For ease and convenience in manufacture, an inert absorptive grinding aid, such as natural clays, diatomaceous earth, synthetic minerals derived from silica, and the like may be used. Preferred grinding aids include, but is not limited to, attapulgite clay, diatomaceous earth, synthetic fine silica, synthetic calcium silicate and synthetic magnesium silicates. Wetting agents, as hereinafter described can also be incorporated in the dust composition.

The inert solid extenders, for use in dusts, are of vegetable and mineral origin and possess relatively low surface areas and poor liquid absorption. Extenders used include, but is not limited to, micaceous talcs, illitic clay, pyrophyllite, dense kaolin clays, ground calcium phosphate, rock dust and tobacco dust.

Dusts usually contain from about 0.5 to 99 parts active ingredient, 0 to 50 parts grinding aid, 0 to 3 parts wetting agent and 1 to 99.5 parts dense solid extender, all parts being by weight based on the total weight of the dust.

Wettable powder herbicidal compositions are similar to the powder or dust composition. A wettable herbicidal powder is a water-dispersible composition containing one or more active ingredients, an inert solid extender and one or more wetting and dispersing agents.

The preferred wetting agent includes alkyl benzene sulfonates, alkyl naphthalene sulfonate, sulfated fatty alcohols, sulfated fatty amines or sulfated fatty acid amides, long chain acid esters of sodium isothionate, esters of sodium sulfosuccinate, sulfated or sulfonated fatty acid esters, petroleum sulfonates, sulfonated vegetable oils, ditertiary acetylinic glycols and the like. Preferred dispersants are methyl cellulose, polyvinyl alcohol, sodium liquor sulfonates, polymeric alkyl naphthalene sulfonates, sodium naphthalene sulfonates, polymethylene bis-naphthalenesulfonate and sodium N-methyl-N-(long chain acid) taurates.

Inert solid extenders for use in wettable powder compositions are usually of mineral origin such as the natural clays, diatomaceous earth and synthetic minerals derived from silica and the like. The extenders include, but are not limited to kaolinites, attapulgite clay and synthetic magnesium silicate.

The wettable powder compositions of this invention usually contain from about 5 to about 95 parts of active ingredient, from about 0.25 to about 3.0 parts of wetting agent, from about 0.25 to about 7 parts of dispersant and from about 4.5 to about 94.5 parts of inert solid extender, all parts being by weight of the total composition. A corrosion inhibitor and/or antifoaming agent may be substituted, where needed, for from about 0.1 to 2 parts by weight of the solid inert extender.

Aqueous suspensions are usually prepared by mixing together, in water, a water insoluble active ingredient with dispersing agents to obtain a concentrated slurry of very small and finely-divided particles. This concentrate when diluted and sprayed provides a very uniform coverage.

Emulsifiable oils are usually solutions of the active ingredient in water-immiscible solvents together with a surfactant. The composition generally contains from about 5 to 95 parts active ingredient, about 1 to 10 parts surfactant and about 4 to 94 parts solvent, all parts being by weight based on the total weight of the composition. Solvents which are used in this composition includes, but is not limited to, hydrocarbons and water immiscible ethers, esters, ketones and the like. The surfactant may be anionic, cationic or non-ionic and includes alkyl aryl polyethoxy alcohols, alkyl and alkyl aryl polyether alcohols, polyethylene sorbitol or sorbitan fatty acid esters, polyethylene glycol fatty esters, amine salts of fatty alcohol sulfates, long chain alcohols and oil soluble petroleum sulfonates or mixtures thereof.

Granules are physically stable particulate compositions comprising an active ingredient adhering to or distributed through a basic matrix of an inert, finely-divided particulate extender. Preferred extenders are the porous, absorptive, preformed particles such as the pre-formed and screened particulate, and the finely-divided clays such as kaolin clays, hydrated attapulgite, illitic clay or bentonitic clays. These extenders are blended or sprayed with the active ingredient to form the granules. The mineral particles are usually in the size range of 10 to 100 mesh, with 14 to 80 mesh being preferred and 20 to 40 mesh being the optimum size desired.

Granular compositions are comprised of about 0.05 to 30 parts by weight of active component per 1 part by weight of clay and about 0 to 0.05 parts by weight of wetting agent per 1 part by weight of clay.

The herbicidal and soil sterilant composition of this invention can include other additaments, such as, fertilizers, other phytotoxicants, pesticides and the like, used as adjuvants or in combination with any of the above-described adjuvants.

Phytotoxicants useful in combination with and as synergistic mixtures with the compounds of this invention include 2,4-dichlorophenoxyacetic acid, 2,4,5-trichlorophenoxyacetic acid, 2-methyl-4-chlorophenoxyacetic acid and their salts, esters and amides; triazine derivatives, such as 2,4-bis(3-methoxypropylamino)-6-methylthio-s-triazine, 2-chloro-4-ethyl-amino-6-isopropylamino-s-triazine and 2-ethylamino-4-isopropyl-amino-6-methylmercapto-s-triazine; urea derivatives, such as 3-(3,4-dichlorophenyl)-1,1-dimethyl urea and 3-(p-chlorophenyl)-1,1-dimethyl urea, 3-(3,4-dichlorophenyl)-1-methyl-1-methoxy urea; acetanilides such as N-isopropyl-α-chloroacetanilide, N-ethyl-α-chloro-2-methylacetanilide and 2-t-butyl-2''-chloro-6-methyl acetanilide; acetamides, such as N,N-diallyl-α-chloro-acetamide, N-(α-chloroacetyl) hexamethylene imine, N,N-diethyl-α-bromoacetamide and the like.

The compounds of this invention can be applied to the soil or plant system in any convenient fashion, such as mixing with the media, by applying to the surface of the soil in dry form and thereafter dragging or discing into the soil to the desired depth, by employing a liquid carrier to carry the ingredient into the soil, and the like. Application to plants can be by any of the conventional methods, such as powder dusters, boom and hand sprayers, spray dusters and the like.

The desired rate of application is as previously recited, however, quantities outside this range can be used. Optimum application rate is dependent upon, among others, soil texture, desired depth of ingredient in the soil, and the specific use for which applied, such as pre- or post-herbicidal activity or soil sterilant. In soil applications, it is desirable that the active ingredients be distributed to a depth of at least 0.2 inches. One skilled in the art can readily determine from this specification, including examples, the application rate for any specific situation.

While the illustrative embodiments of this invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A herbicidal composition comprising a herbicidally effective amount of a compound of the formula $(CH_2=N-R)_3(R^1NCO)_2$ and selected from the group consisting of

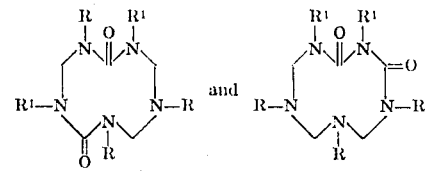

wherein R is alkyl having a maximum of four carbon atoms and $R^1$ is selected from the group consisting of mononitro-substituted phenyl and mono- or dichloro-substituted phenyl.

2. A herbicidal composition in accordance with claim 1, in which R is methyl and $R^1$ is mono- or dichlorophenyl.

3. A herbicidal composition in accordance with claim 2, in which $R'$ is 3,4-dichlorophenyl.

4. A herbicidal composition in accordance with claim 2, in which $R'$ is 4-chlorophenyl.

5. A method for the control of vegetation which comprises applying to a locus to be protected a herbicidal composition comprising a herbicidally effective amount of a compound of the formula $(CH_2=N-R)_3(R^1NCO)_2$ and selected from the group consisting of

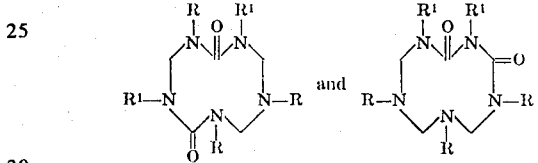

wherein R is alkyl having a maximum of four carbon atoms and $R^1$ is selected from the group consisting of mononitro-substituted phenyl and mono- or dichloro-substituted phenyl.

6. A method for the control of vegetation in accordance with claim 5, in which R is methyl and $R^1$ is mono- or dichlorophenyl.

7. A method for the control of vegetation in accordance with claim 6, in which $R'$ is 3,4-dichlorophenyl.

8. A method for the control of vegetation in accordance with claim 6, in which $R'$ is 4-chlorophenyl.

* * * * *

UNITED STATES PATENT OFFICE
CERTIFICATE OF CORRECTION

Patent No. 3,723,087        Dated March 27, 1973

Inventor(s) John Paul Chupp

It is certified that error appears in the above-identified patent and that said Letters Patent are hereby corrected as shown below:

On the cover page of the patent, the inventor's name which reads as "John P. Chapp," should read
- - John P. Chupp, - -.

Column 1, line 32, which reads as
"$3(CH_2=_N-R) + 2\ R^1NCO \rightarrow (CH_2=R)_3\ (R^1NCO)_2\ I$" should read
- - $3(CH_2=_N-R) + 2\ R^1NCO \rightarrow (CH_2=N-R)_3\ (R^1NCO)_2\ I$ - -.

Signed and sealed this 18th day of June 1974.

(SEAL)
Attest:

EDWARD M. FLETCHER, JR.
Attesting Officer

C. MARSHALL DANN
Commissioner of Patents